United States Patent [19]
Box

[11] 4,061,280
[45] Dec. 6, 1977

[54] MIXING APPARATUS FOR FEED TO INJECTION MOLDING MACHINE

[76] Inventor: Theodor M. Box, 1108 Aileen Road, Brielle, N.J. 08730

[21] Appl. No.: 736,741

[22] Filed: Oct. 29, 1976

[51] Int. Cl.² .............................................. B02C 18/22
[52] U.S. Cl. ................................. 241/101.6; 198/731; 198/748; 221/227; 241/280; 425/3; 425/130
[58] Field of Search .............. 241/101 B, 101.5, 101.6, 241/280, 281, 282; 221/227; 425/3, 130; 198/731, 748

[56] References Cited

U.S. PATENT DOCUMENTS

| | | | |
|---|---|---|---|
| 2,155,306 | 4/1939 | Ferguson | 198/731 X |
| 3,760,935 | 9/1973 | Ziegelmeyer | 198/731 |
| 3,810,555 | 5/1974 | Bakker et al. | 241/280 X |
| 3,811,627 | 5/1974 | Bradbury et al. | 241/281 |

FOREIGN PATENT DOCUMENTS 2,405,440  11/1974  Germany ............................. 241/280

Primary Examiner—Roy Lake
Assistant Examiner—Howard N. Goldberg

[57] ABSTRACT

Apparatus for grinding pigment and for introducing predetermined amounts of pigment to plastic material being fed to an injection molding machine. The pigment is ground from bars by a helical grinder energized by variable speed means which controls the ratio of pigment to plastic in the feed to the injection screw. Positive displacement pigment feeding means is included having automatic disengagement means associated with the feeding means for disengaging the latter when the pigment material has become substantially exhausted. The feeding means is chain driven and is adjustable relative to the chain to ensure there is no slack between the feeding means and the pigment bars.

4 Claims, 10 Drawing Figures

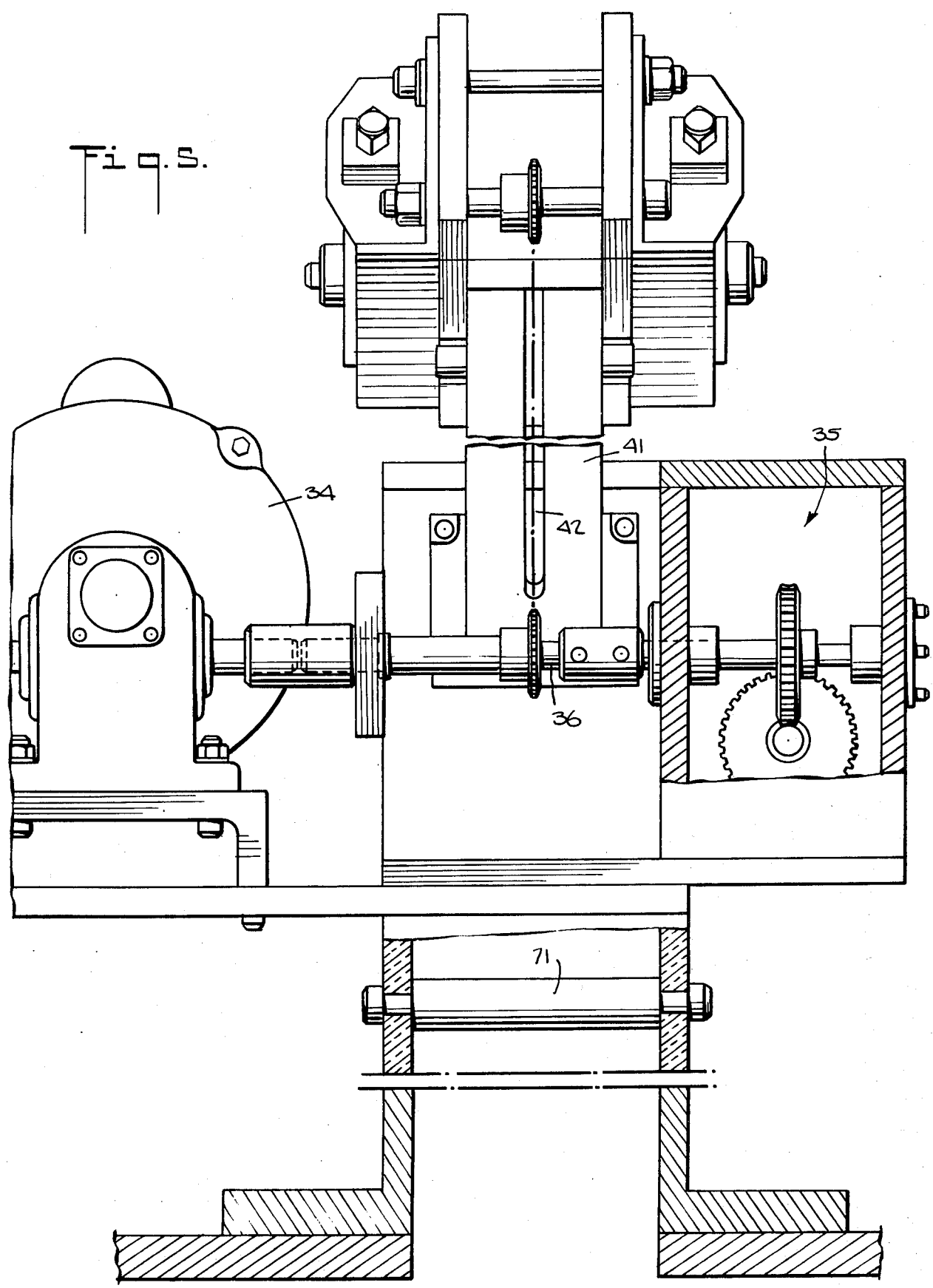

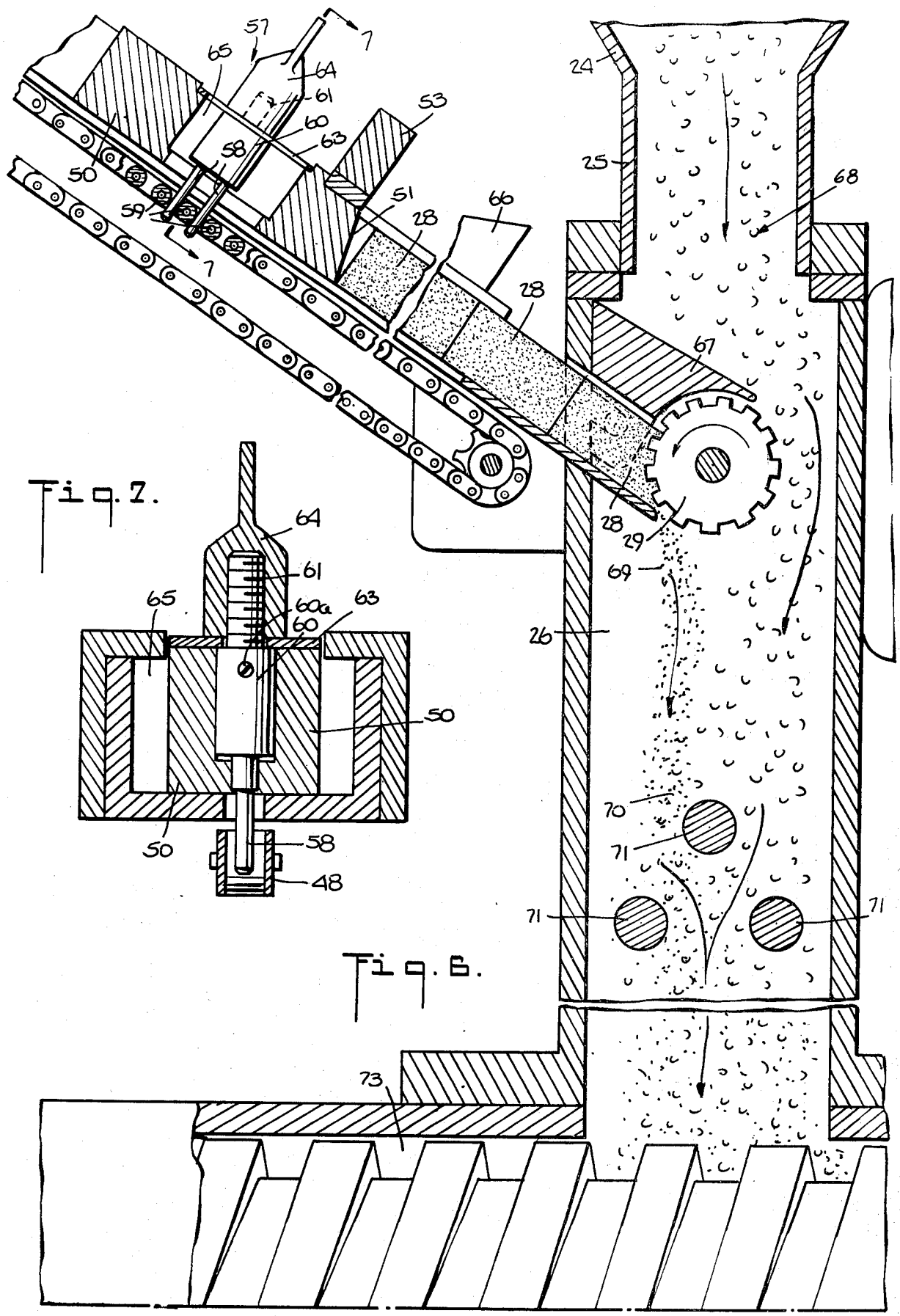

MIXING APPARATUS FOR FEED TO INJECTION MOLDING MACHINE

BACKGROUND OF THE INVENTION

It has been known heretofore to comminute pigment bars and mix the pulverulent pigment material with plastic pieces being fed to a plastic article forming machine. One such apparatus is disclosed in U.S. Pat. No. 3,811,627 issued May 21, 1974. The patented apparatus includes timer means which controls the period of operation of a rotary cutter thereby determining the relative amount of pigment being mixed with the plastic material to control the depth of color in the finished article. A rotating cutter operates continuously during the reverse cycle of the ram and the rate of feeding pigment to the cutter is controlled by a timer controlling the operation of a plurality of rollers with frictionally engage and advance pigment bars into contact with the rotary cutter. The rollers operate only during a controlled preselected time interval.

In the patented device, to change the relative amount of pigment being added to the plastic, it is necessary to change gear ratios or by changing the length of the time portion cycle. There is no means for instantaneously adjusting said ratio and as a result operation with such prior art apparatus is cumbersome.

BRIEF SUMMARY OF THE INVENTION

The present invention provides a color grinder means for use in conjunction with an injection molding machine which permits instantaneous manual adjustment of the feed ratio of pigment/plastic and consequently instantaneous manual control over the depth of color of the finished article. This is accomplished by variable speed means controlling the speed of rotation of the grinding mechanism which in turn is geared through reduction gears to a sprocketed chain pigment bar propulsion device having a pusher block that moves pigment bars against the grinder at a controlled rate. Cam means is provided for disengaging the pusher block from the chain drive means when it nears the lower end of the inclined feed channel. The ground pigment is intermixed with plastic particles delivered from a hopper in an inlet throat adjacent the injection screw of the molding machine. Magnet means is provided in said throat for removing any iron contamination. The pusher block is adjustable relative to the chain drive to avoid any slack between the pusher block and the pigment bars.

Other objects and features of the invention will become apparent in the following specification and drawings.

DESCRIPTION OF THE DRAWINGS

FIG. 5 is an enlarged elevation in partial section showing the drive motor and gearing for the grinder;

FIG. 6 is a fragmentary side elevation similar to FIG. 3 showing the flow of particles from the hopper and the grinder during operation of the machine;

FIG. 7 is an enlarged cross-sectional view of pusher block assembly taken along line 7—7 in FIG. 6;

FIG. 10 is a schematic diagram of the electro-mechanical control means.

DESCRIPTION OF THE PREFERRED EMBODIMENT

Figure 1:
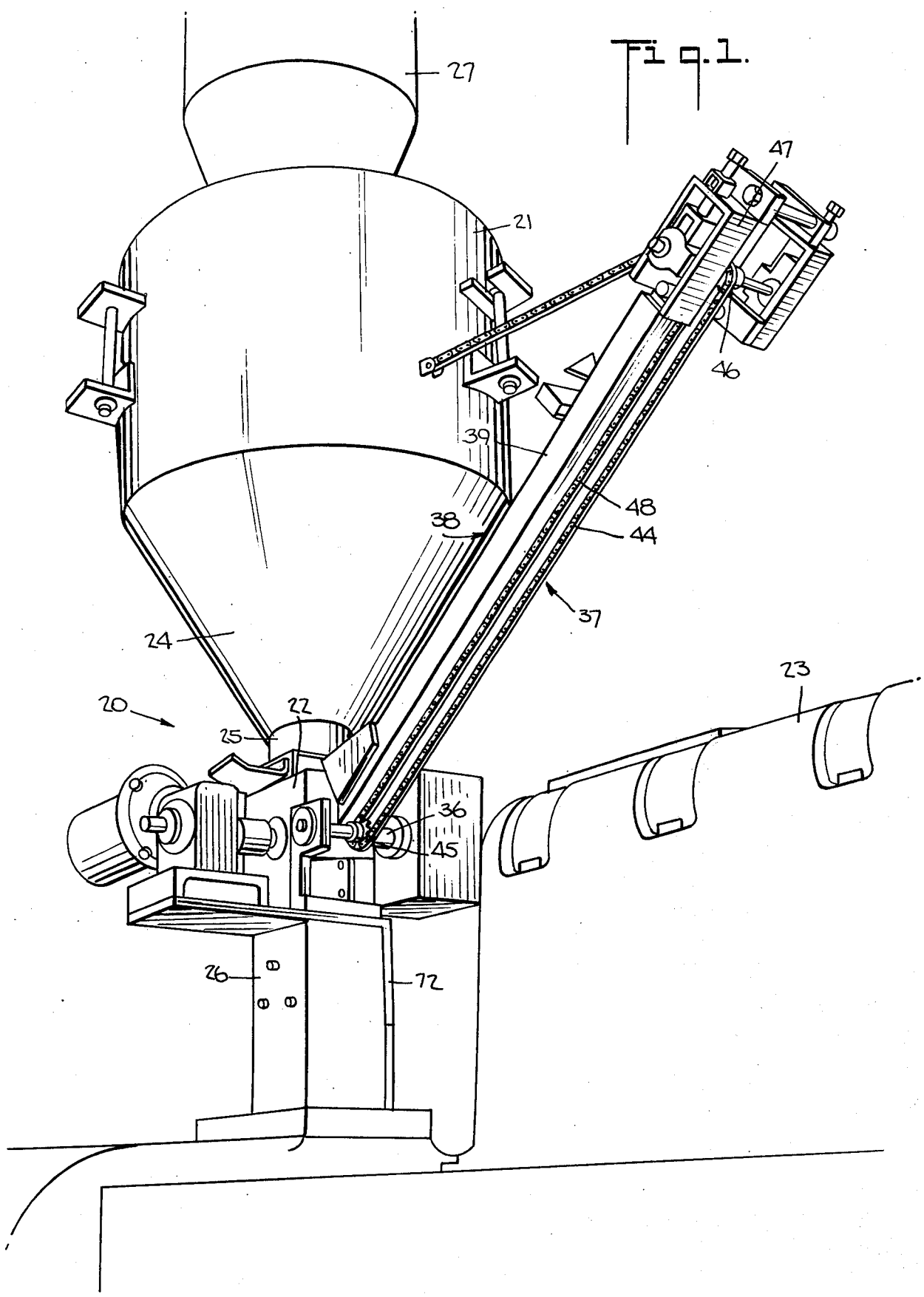
FIG. 1 is an isometric view of the feed hopper, color grinder and pigment bar feed mechanism.
Figure 3:
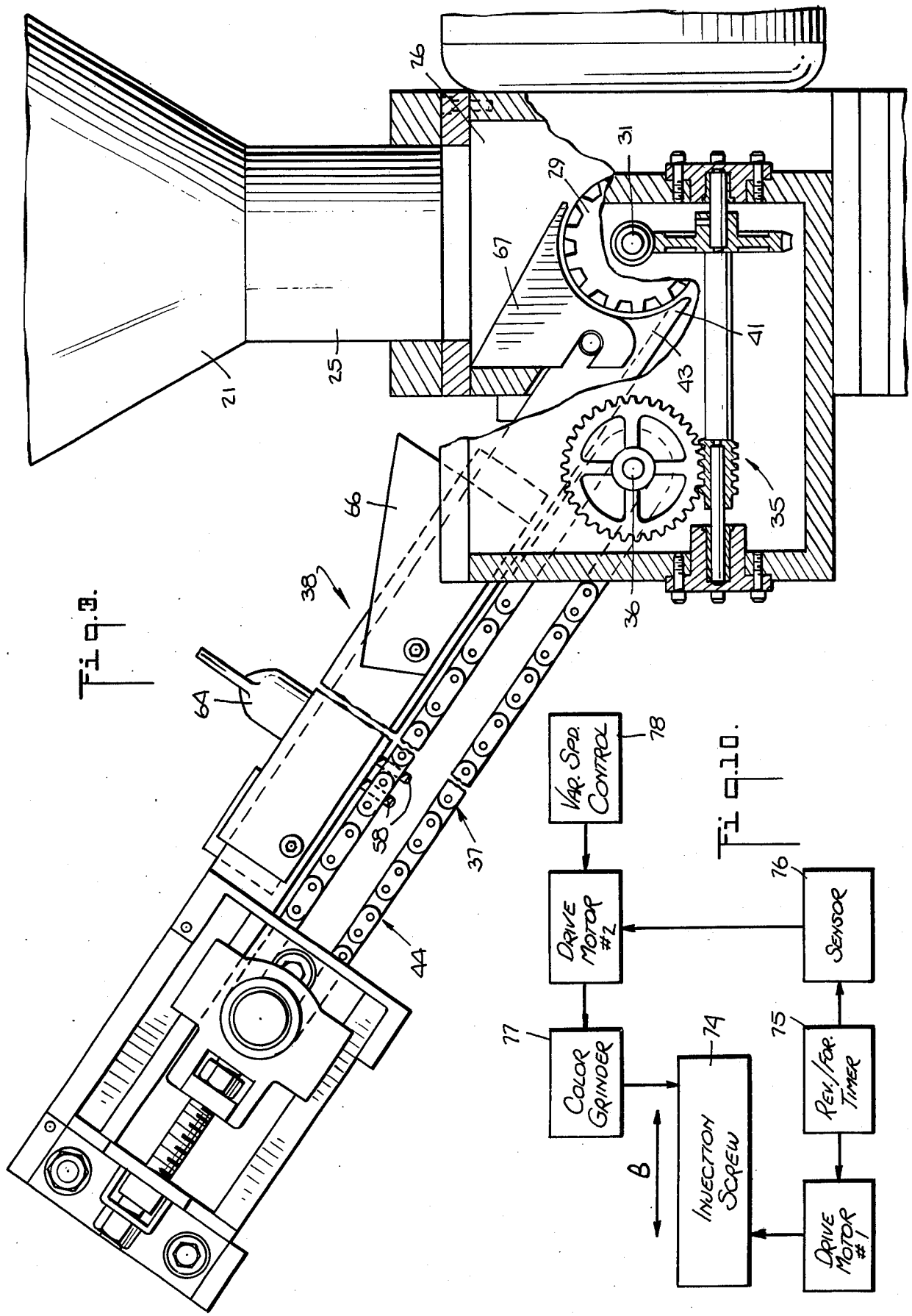
FIG. 3 is an enlarged fragmentary side elevation of the apparatus of FIG. 1.
Figure 4:
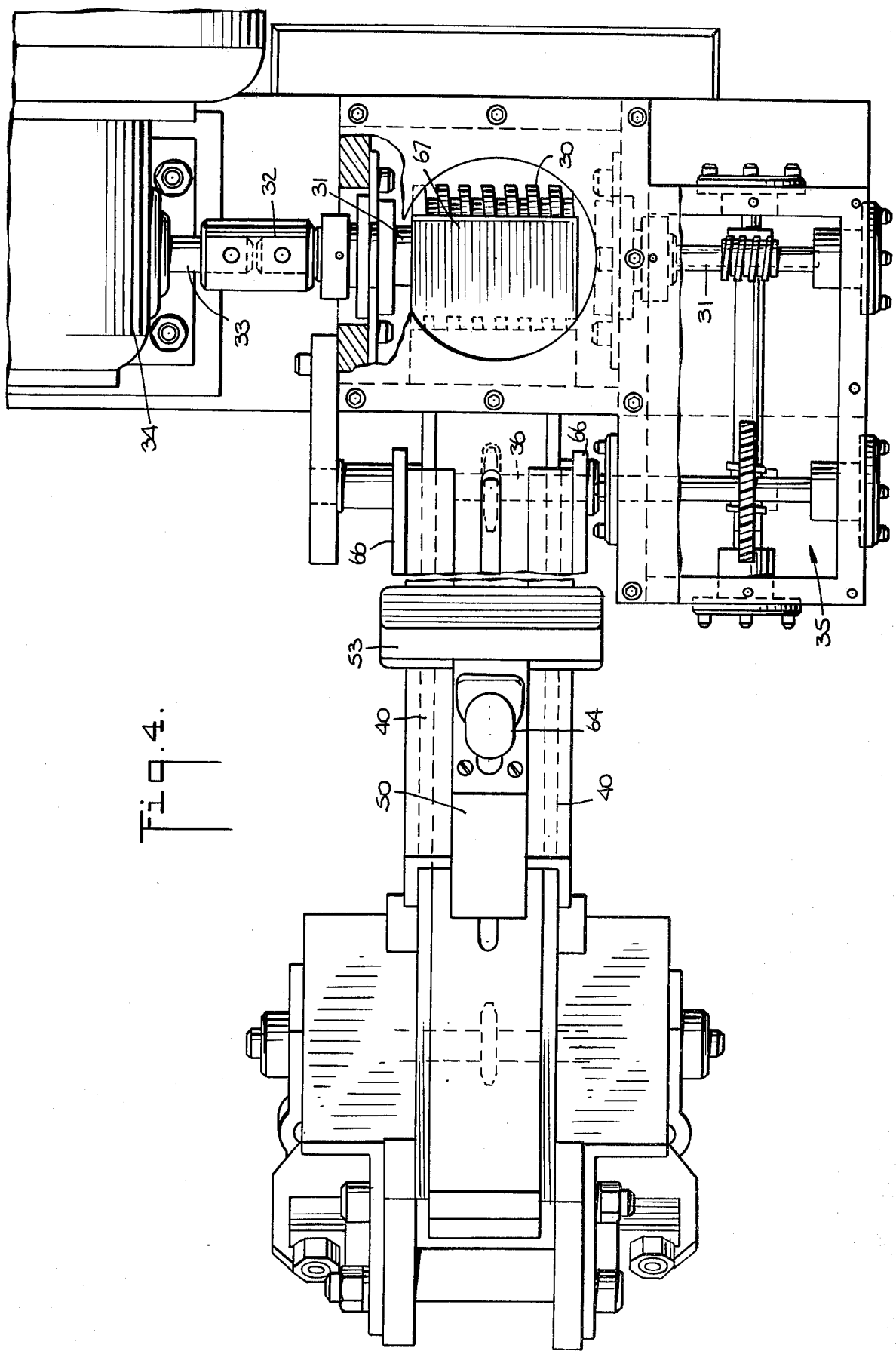
FIG. 4 is a fragmentary elevation in partial section of the apparatus of FIG. 3.

Referring now to the drawings, particularly FIG. 1, color grinder apparatus in accordance with the present invention is designated generally by reference numeral 20. The overall apparatus consists of hopper 21 disposed vertically above color grinder housing 22. Hopper 21 contains resin or plastic material in pellet or other particulate form which is to be injection molded in the associated injection molding machine 23. Hopper 21 has an inverse conical lower portion 24 tapering to a cylindrical bottom tube 25 which interconnects with grinding chamber or throat portion 26 (see also FIG. 3 and 6). Disposed above hopper 21 and communicating therewith is vacuum loader 27 which delivers predetermined amounts of plastic material to hopper 21.

Figure 9:
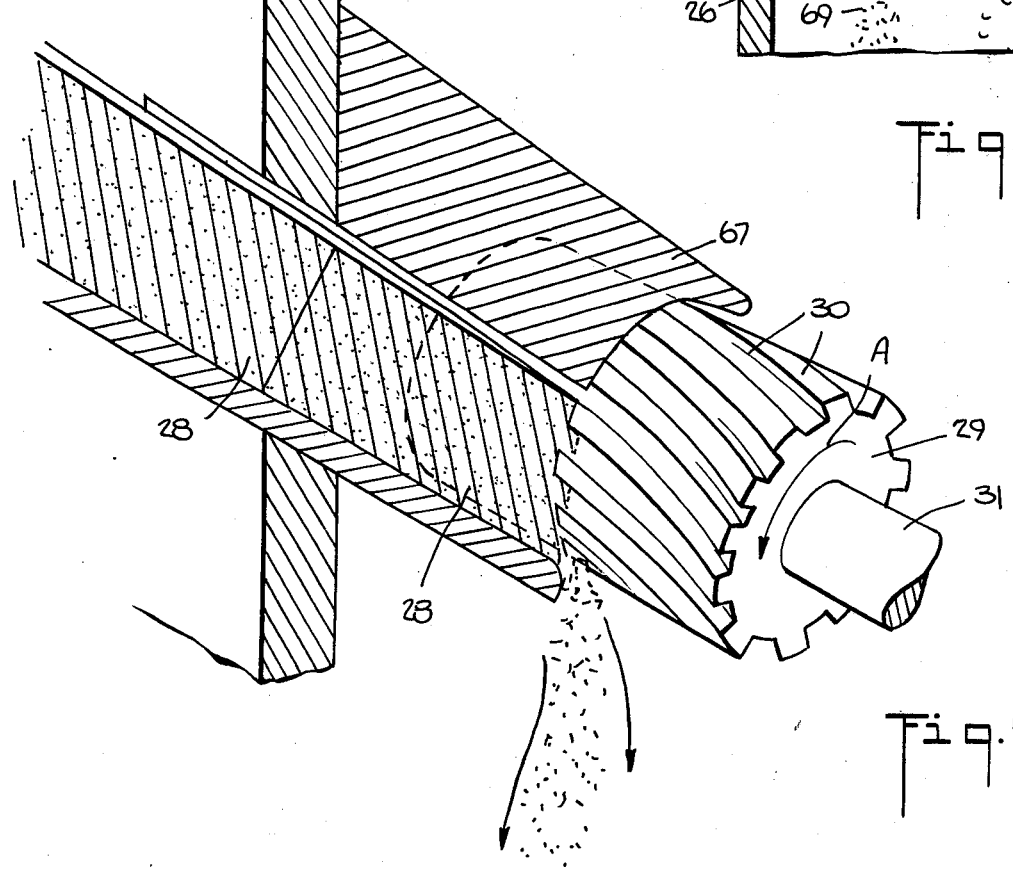
FIG. 9 is a detail of the cutter.

The shaving or comminution of pigment blocks 28 is performed by rotary cutter 29 which is an elongated cylindrical member having sharp helical cutting teeth 30 in its outer surface (see FIG. 9). The cutter is rotatably mounted on shaft 31 which is interconnected by coupling 32 to the shaft 33 of drive motor 34 and is thereby driven in the direction of arrow A, i.e., in a downward vertical direction against pigment block 28. Reduction gearing 35 interconnected to grinder shaft 31 provides rotation at a reduced speed for drive shaft 36 of the sprocketed chain drive assembly 37.

The pigment bar feeding device is designated generally by reference numeral 38 and is comprised of inclined channel member 39 having a pair of inwardly extending upper lips or flange members 40 (see FIG. 2) extending along the length thereof to provide upper bearing surfaces. The bottom 41 of said channel member is provided with axially extending central slot 42. Said channel member 39 terminates at its lower end 43 immediately adjacent rotary cutter 29. Drive chain 44 is trained about sprocket member 45 on drive shaft 36 and idler sprocket 46 journaled to the upper end 47 of channel member 39. The upper flight 48 of chain 44 extends below and in alignment with slot 42.

Figure 2:
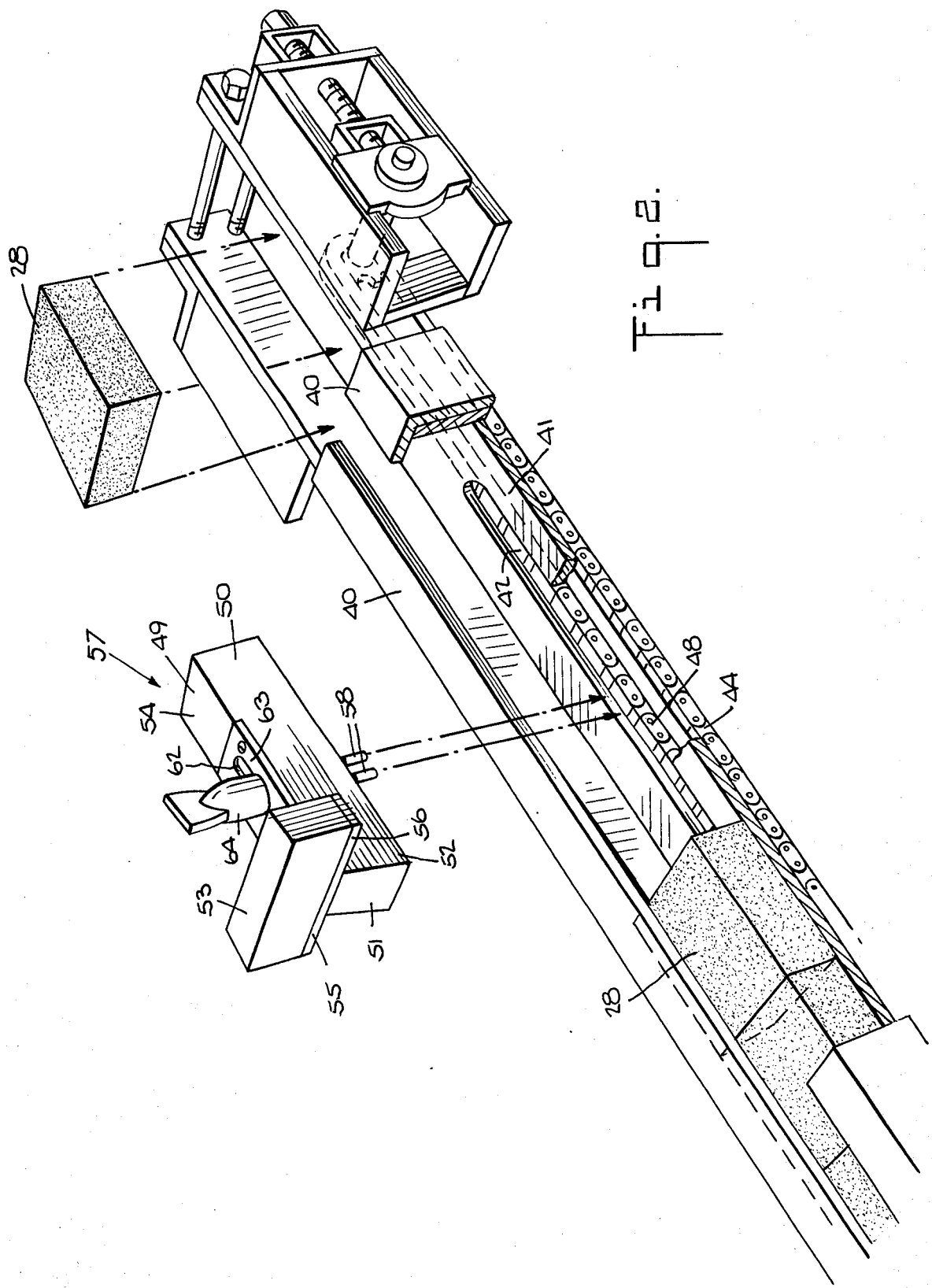
FIG. 2 is a detailed schematic of the pigment bar feeding mechanism.

Referring to FIG. 2, pigment propulsion means is shown and comprises pusher block 49 which is comprised of an elongated generally rectangular body portion 50 having an inclined face 51 at forward end 52 thereof which also carries cross piece 53 on the upper surface 54 of said block 50 providing laterally extending shoulder members 55, 56. Adjustable chain engaging pin device 57 is centrally disposed in block member 50 and is provided at its lower end with a pair of pin members 58 which extend downwardly from block 50 and are engageable between continuous links 59 in the upper flight 48 of chain 44 (see FIGS. 2, 3, 6 and 7). Pins 58 are mounted on body member 60 having an upper threaded portion 61 extending through longitudinal slot 62 in plate 63 secured to the upper surface of block 50. Threaded cap 64 threadably engages threaded portion 61 and secures body member 60 against plate 63. As can be seen this arrangement provides longitudinal adjustability for pin members 68 relative to block 50 by adjustment in a longitudinal direction of body member 60 in interior cavity 65 of block 50. Such an adjustment insures that pusher block 50 will maintain pigment bars 28 against one another with no spaces between them and still have pin members 58 properly engaged with the chain to avoid any accidental breaking of pigment bars prior to their being advanced against rotary cutter 29. Pin members 58 may be integrally formed or permanently secured to body member 60 or may be separate elements axially adjustable relative to body member 60 and retained therein by set screws 60a (one shown in FIG. 7).

Figure 8:
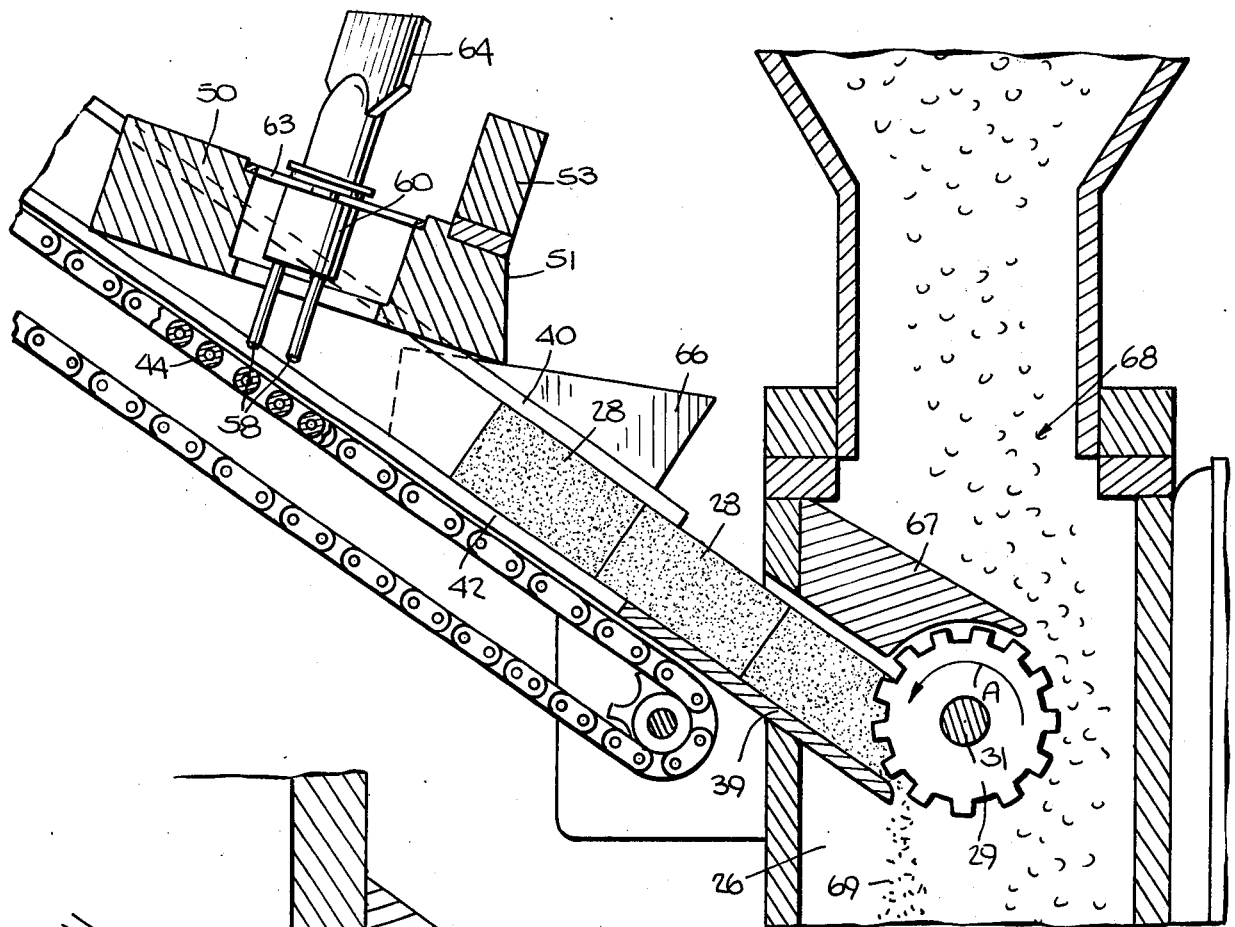
FIG. 8 is a side elevation in partial section showing disengagement of the pusher block from the sprocketed chain drive by the cam means.

Provided near the lower end of channel 39 and affixed to either side thereof are a pair of angular cam plates 66 which are engaged by the lateral shoulders 55, 56 on block member 50 to raise the pins 58 out of engagement with chain drive 44 (see FIG. 8) to prevent the chain drive from advancing pusher block 50 into rotary cutter 29 at the end of its travel.

In grinding chamber 26, cover plate 67 extends out over rotary cutter 29 to deflect downwardly falling plastic particles 68 beyond rotary cutter 29 to avoid interference with the grinding of pigment bars 28 into shavings 69. Mixing of the two types of particles occurs in the lower portion 70 of grinding chamber 26.

A plurality of magnet bars 71 are disposed in the lower portion 70 of grinding chamber 26 (see FIGS. 5 and 6) to remove any iron particles or the like that may inadvertently be present. A transparent plastic window 72 is disposed in the housing adjacent to side lower portion 70 for visual observation of the particle mixture entering injection screw chamber 73.

Referring now to FIG. 10, the relationship of the electromechanical system can be seen. The injection screw or ram 74 is moved reciprocally in the direction shown in arrow B, forward as viewed in FIG. 10 to the left and backward as viewed to the right. Drive motor No. 1 imparts such reciprocal motion to the injection screw as controlled by reverse-forward timer 75. Sensor 76 senses rearward motion of injection screw 74 and energizes the drive motor No. 2 which activates color grinder 77 during the rearward motion or retraction period. Drive motor No. 2 is controlled by variable speed control 78 which is manually adjustable to set the actual speed of the color grinder which in turn determines the reduced speed of the pigment bar feeding mechanism.

As can be seen from the above description, an improved means for grinding and mixing pigment with injection molded plastic material is provided. Since the pigment material is added at the machine throat, the machine feed hopper is free from any contaminating material in the hopper when it is desired to change to another color. The addition of color occurs automatically only during injection screw retraction, i.e., during the plasticizing process. The travelling speed of the pigment bars can be adjusted by adjusting the speed of rotation of the grinder. The change from one color to another can be effected in seconds without the need for cleaning the equipment. It is only necessary to remove the remaining pigment bars from the feed channel and replace them with bars of the different color or to utilize a purging bar between the original pigment bar and the bar of the next color.

By having the adjustable interconnection between the pusher block and the chain drive, the pusher block has very little play which prevents breakage of the color bars and eliminates lumps appearing in the pigment-resin mixture. The rotation of the cutter and the down flow of the resin creates satisfactory mixing of the two materials before entering the injection screw where further mixing and homogenizing is accomplished.

While one embodiment of the invention has been shown and described herein, it is to be understood that changes and additions may be made by those skilled in the art without departing from the scope and spirit of the invention.

I claim:

1. In an injection molding machine of the type for molding articles from particulate plastic material fed in measured amounts from a hopper to a reciprocally operated injection screw and having a color grinder associated with said hopper for introducing predetermined amounts of pigment to said plastic material, the improvement comprising variable speed means interconnected with said color grinder to control the amount of pigment relative to the amount of plastic material being fed to said injection screw, propulsion means associated with said color grinder for providing positive displacement feeding of said pigment to said color grinder, and safety release means on said pigment propulsion means for disengaging the latter means when said propulsion means moves near said grinder.

2. The apparatus of claim 1 including sensor means associated with said injection screw and being actuated by the withdrawal movement of said screw relative to the mold to energize said color grinder.

3. In the apparatus of claim 2, said propulsion means comprising an inclined channel connected at its lower end to said color grinder and adapted to receive rectangular pigment bars in end to end relation and deliver them sequentially to said grinder, said channel having inwardly turned upper lips along its length to provide upper bearing surfaces and also having a longitudinal slotted bottom portion, said pigment propulsion means comprising pusher block means slideably disposed in said channel and adapted to push against said pigment bars, said pusher block means having a pair of opposed transverse upper shoulder members disposed in slideable contact with said bearing surfaces of said channel, a sprocket chain drive assembly disposed adjacent the underside of said channel in alignment with said slotted portion, bottom projections on said pusher block engageable with said chain drive adapted to move said block along said channel toward said grinder in synchronism with said chain drive, motor means for driving said color grinder, gear means interconnecting said motor means with said chain drive assembly for moving the latter at a reduced speed relative to said color grinder, said safety release means comprising cam means on said channel lips at said lower end of said channel, said shoulder members on said pusher block engageable with said cam means to disengage said pusher block projections from said chain drive assembly when said pusher block reaches said lower end of said channel.

4. In the apparatus of claim 3, said bottom projections being longitudinally adjustable relative to said pusher block.

* * * * *